United States Patent [11] 3,618,974

[72] Inventor Richard Chute
 Huntington Woods, Mich.
[21] Appl. No. 814,031
[22] Filed Apr. 7, 1969
[45] Patented Nov. 9, 1971
[73] Assignee Eaton Yale & Towne Inc.
 Cleveland, Ohio

[54] VEHICLE SAFETY APPARATUS
 6 Claims, 3 Drawing Figs.
[52] U.S. Cl. .................................................. 280/150 AB
[51] Int. Cl. ........................................................ B60r 21/10
[50] Field of Search ........................................... 280/150;
 180/82, 103

[56] References Cited
 UNITED STATES PATENTS
2,850,291 9/1958 Ziccardi ....................... 280/150
2,931,665 5/1960 Sandor ......................... 280/150
3,414,292 12/1968 Oldberg et al. ............... 280/150
3,450,414 6/1969 Kobori ......................... 280/150

Primary Examiner—Kenneth H. Betts
Attorney—Yount, Flynn & Tarolli

ABSTRACT: A safety apparatus for protecting an occupant of a vehicle during an accident includes a confinement having a collapsed condition and an expanded condition. Located within the confinement is a liquid reservoir having a gas-producing liquid stored under low pressure therein. An explosive charge is situated within the liquid reservoir and is ignited or detonated upon the occurrence of an accident to burst the reservoir and disperse or impel the gas-producing liquid in a particalized form into the confinement. The particalized liquid quickly vaporizes nd effects expansion of the confinement so as to protect the occupant of the vehicle from injury during the accident.

PATENTED NOV 9 1971
3,618,974
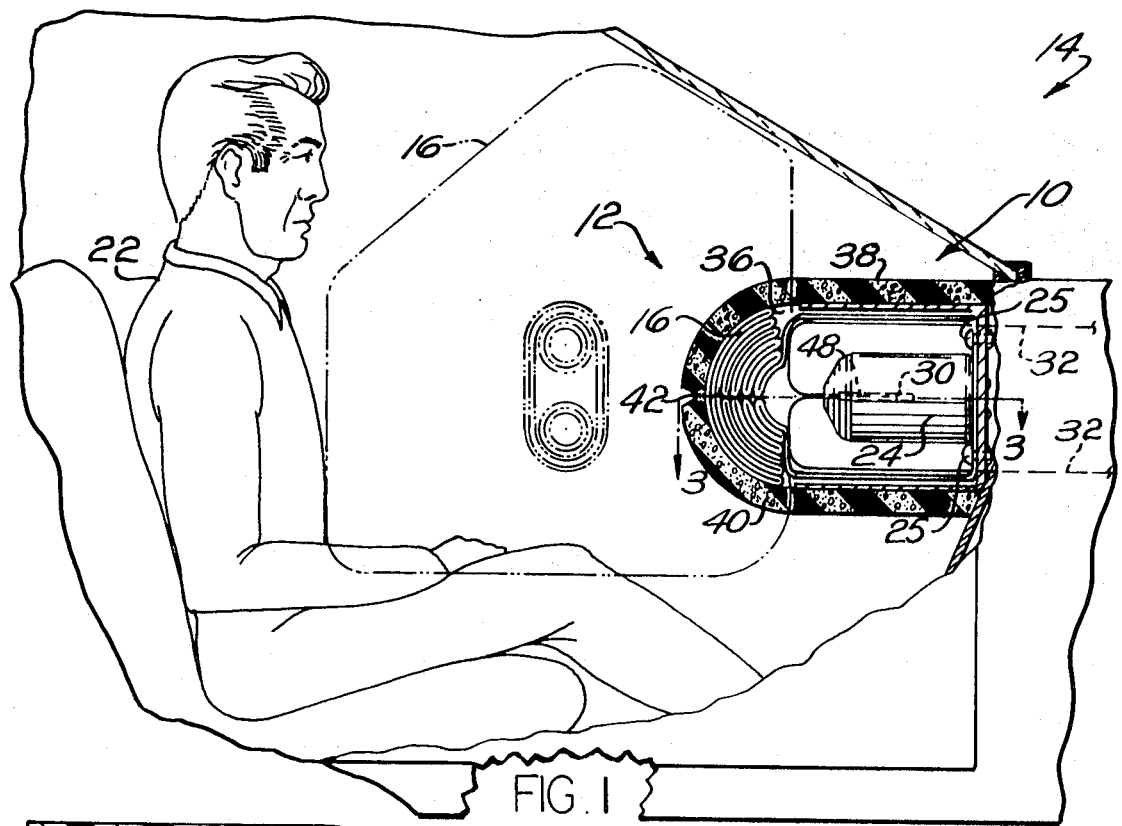
FIG. 1
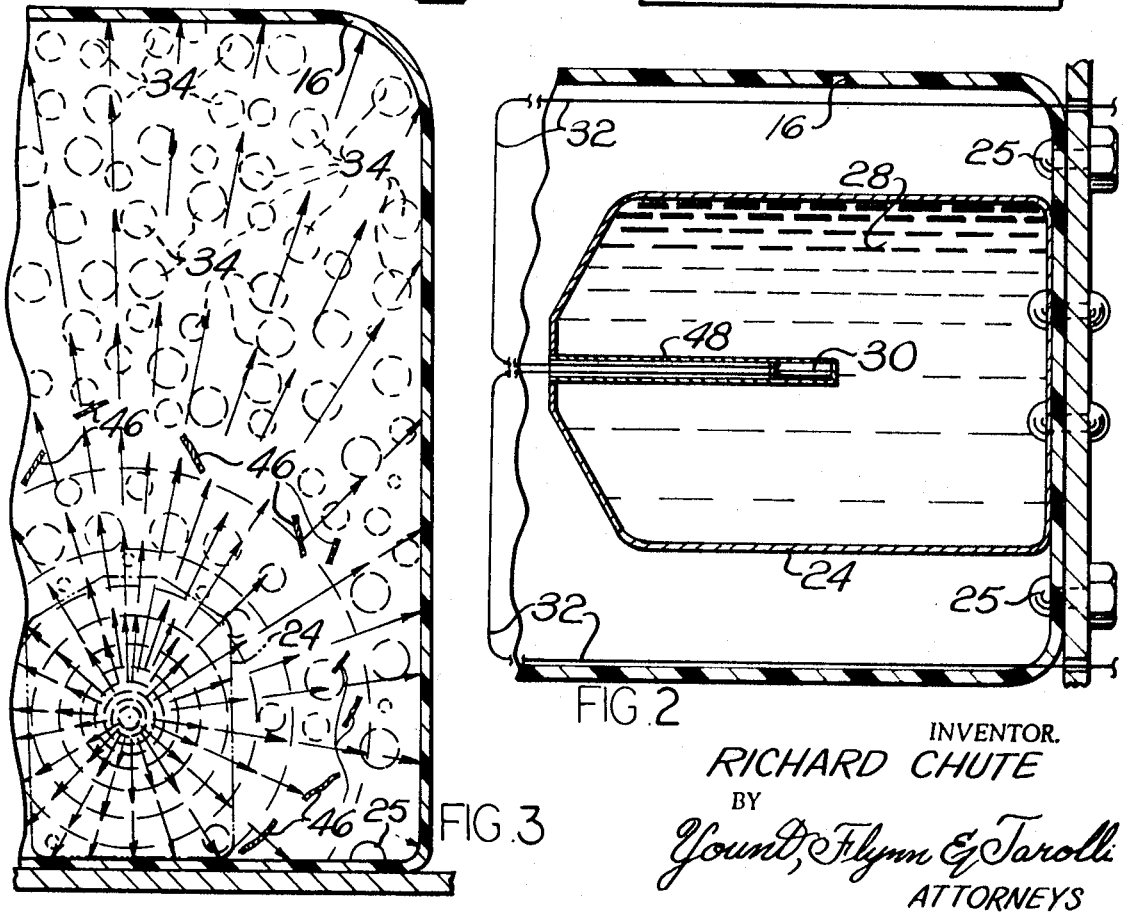
FIG. 2
FIG. 3
INVENTOR.
RICHARD CHUTE
BY
Yount, Flynn & Tarolli
ATTORNEYS

VEHICLE SAFETY APPARATUS

The present invention relates to a vehicle safety apparatus including a gas-producing liquid which is particalized and then quickly vaporized to expand a confinement from a collapsed condition to an expanded condition to protect an occupant of the vehicle during an accident.

A known safety apparatus includes a confinement having an expanded or operative condition and a collapsed or inoperative condition, a high-pressure fluid reservoir, and means for releasing the high-pressure fluid from the fluid reservoir and directing the fluid into the confinement to effect expansion of the confinement upon the occurrence of an accident. This known safety apparatus has disadvantages inherently associated with the storage of fluid at a high pressure in a fluid reservoir. Specifically, this known safety apparatus experiences problems in storing the fluid at a high pressure over a long period of time. It is necessary to store the fluid for a long period of time since for any given vehicle accidents are statistically relatively infrequent. Due to the wide variations in operating conditions encountered by most vehicles over an extended period of time, a fluid loss and corresponding pressure drop is likely to occur upon storage of this known safety apparatus for an extended period of time. Of course, such a pressure drop may seriously impair the operability of the safety apparatus. Furthermore, the handling of high-pressure fluid containers required in this known safety apparatus is particularly dangerous since the pressure containers are designed to discharge upon the happening of a predetermined event.

Therefore, it is an object of the present invention to provide a new and improved safety apparatus which utilizes a fluid stored at a relatively low pressure to expand a confinement with protects an occupant of a vehicle during an accident.

Another object of the present invention is the provision of a new and improved method and apparatus for protecting an occupant of a vehicle during an accident wherein the method and apparatus includes means for first particalizing and then vaporizing a gas-producing liquid to expand a confinement upon the occurrence of an accident.

Still another object of the present invention is to provide a new and improved safety apparatus for protecting an occupant of a vehicle during an accident wherein the safety apparatus includes an expandable confinement for restraining movement of an occupant of the vehicle and an explosive means for particalizing a gas-producing liquid to promote vaporization of the liquid and rapid expansion of the confinement upon the occurrence of an accident.

A further object of the present invention is to provide a new and improved safety apparatus including a expandable confinement for restraining movement of an occupant of the vehicle during an accident, a gas-producing liquid, and an explosive means operable upon the occurrence of an accident to both heat and effect particalization of the gas-producing liquid to thereby promote vaporization of the liquid and rapid expansion of the confinement.

A still further object of the present invention is the provide a new and improved safety apparatus including an expandable confinement for restraining movement of an occupant of the vehicle, a fluid reservoir containing a gas-producing liquid, and an explosive charge disposed centroidally in the fluid reservoir and operable upon the occurrence of an accident to burst the fluid reservoir and project a gas-producing liquid stored in the reservoir into the interior of the confinement in a particalized form where the liquid is vaporized to expand the confinement to thereby protect an occupant of the vehicle during an accident.

Further objects and advantages of the present invention will be apparent to those skilled in the art to which it relates from the following description of a preferred embodiment made with reference to the accompanying drawings in which:

FIG. 1 is a perspective schematic view illustrating a safety apparatus embodying the present invention and mounted on the dashboard of a vehicle;

FIG. 2 is an enlarged schematic sectional view further illustrating a fluid reservoir and explosive charge for activating the safety apparatus of FIG. 1; and FIG. 3 is an enlarged fragmentary sectional view taken generally long the line 3—3 of FIG. 1 and schematically illustrating the projecting of a particalized fluid into the interior of a confinement by detonation of the explosive charge, the particalized fluid being quickly vaporized to inflate the confinement to the expanded condition illustrated in dashed lines in FIG. 1.

The present invention provides a new and improved safety apparatus for protecting an occupant of a vehicle upon the occurrence of an accident. The safety apparatus includes a confinement movable from a collapsed condition to an expanded condition to protect an occupant of the vehicle. To provide for this expansion of the confinement, a reservoir containing a supply of gas-producing liquid stored under relatively low pressure is associated with the confinement. Upon the occurrence of an accident, an explosive charge centroidally disposed within the reservoir is activated to burst the reservoir and project the gas-producing liquid in a particalized form into the confinement. The particalized liquid is then rapidly vaporized to effect expansion of the confinement. The explosive charge also tends to heat the particalized liquid to further promote vaporization of the liquid.

Although it is contemplated that a safety apparatus constructed in accordance with the present invention can be disposed in many different locations in many different types of vehicles such as airplanes, boats, and tractors, a safety apparatus 10 illustrating the present invention is shown in FIG. 1 mounted on the dashboard 12 of an automotive vehicle 14. The safety apparatus 10 includes a confinement 16 having a collapsed or inoperative condition and an expanded or operative condition illustrated by the phantom lines in FIG. 1. As illustrated in FIG. 1, the confinement is located on the dashboard 12 and is expandable to restrain movement of the occupant 22 upon the occurrence of an accident and to thereby minimize the chance of injury to the occupant 22. Of course, the safety apparatus 10 could be mounted in various positions on the vehicle, such as on the back of the front seat of the vehicle, in order to protect occupants located in other portions of the vehicle.

A liquid reservoir 24 is disposed within the confinement 16. The liquid reservoir 24 (see FIG. 2) is suitably attached to the dashboard 12 of the vehicle by bolts 25. A gas-producing liquid 28 is sealed within the liquid reservoir 24 and is dischargable therefrom upon bursting of the container 24 by detonation or ignition of an explosive charge 30. The explosive charge 30 is connected to a suitable collision sensor, not illustrated, by a pair of wires 32.

Upon the occurrence of an accident, the collision sensor energizes the wires 32 to effect detonation of the explosive charge 30. Detonation or ignition of the charge 30 bursts or ruptures the fluid reservoir 24 in the manner illustrated schematically in FIG. 3. Contemporaneously with this bursting of the reservoir 24, the force resulting from detonation of the explosive charge 30 impels or hurls the gas-producing liquid 28 outwardly into the confinement 16 in a plurality of particles or droplets 34 (FIG. 3). Due to their relatively large combined surface area, the particles or droplets 34 are quickly vaporized to inflate the confinement 16 from the collapsed condition shown in solid lines in FIG. 1 to the expanded condition shown in phantom lines in FIG. 1.

The confinement 16 is advantageously stored in the collapsed condition within a chamber 36 (FIG. 1) defined by resilient panels 38 and 40 of the dashboard 12. Upon expansion of the confinement 16, the panels 38 and 40 are separated along an indentation 42. Of course, the safety apparatus 10 could be mounted on the dashboard 12 in other ways. The gas-producing liquid 28 is stored at a relatively low pressure in its liquid state throughout the range of operating temperatures to which the safety apparatus 10 is ordinarily subjected. To provide for a rapid inflation of the confinement 16 upon the occurrence of an accident, the gas-producing liquid 28 is particalized to expose a large amount of surface area of the liquid to the interior of the confinement. In addition, the vaporization of the liquid 28 is further facilitated by heat transferred to the liquid from the explosive charge when it is detonated. This heat tends to increase the speed at which the liquid is vaporized and therefore, speed at which the confinement is expanded.

It is desirable to have a gas-producing liquid 28 in the reservoir that is in its liquid state throughout the range of storage temperatures associated with the safety apparatus 10. It is also desirable to be able to store the gas-producing liquid 28 in the reservoir 24 at a relatively low pressure. Although many different gasses can be used, one gas-producing liquid which has the desired physical characteristics is Freon. Moreover, although it is contemplated that a gas-producing liquid would be utilized in the present invention, it should be realized that a gas-producing matter, such as solid Freon or a solid gas, could be utilized effectively.

Since the rate of vaporization of any liquid is dependent upon the surface area of the liquid, particalizing the gas-producing liquid 28 creates more surface area and promotes a rapid rate of vaporization of the liquid and inflation of the confinement 16. Thus after the liquid reservoir 24 is burst by the explosive charge 30, the gas-producing liquid 28 is particalized and tends to vaporize because of the increased surface area of the liquid. Vaporization of the liquid is further promoted by the lower pressure to which it is subjected after a bursting of the reservoir 28, i.e., the gas-producing liquid is no longer contained in the reservoir 24, but is disposed in the expandable confinement 16. This results in a more uniform or "soft" inflation of the confinement 16, since the particalized liquid 82 is scattered within the confinement under the influence of the explosive charge 30.

The explosive charge 30 is located near the centroid of the liquid reservoir (FIG. 2). The near centroidal placement of the explosive charge allows the charge 30, upon activation thereof, to effect particalization of the liquid 28 and dispersal of the particles of liquid 34 within the confinement 16. Moreover, the near centroidal placement of the explosive charge 30 in the liquid reservoir 24 effects a shattering or bursting of the container 24 into a plurality of small fragments 46 (FIG. 3) upon activation of the explosive charge rather than opening a small portion of the reservoir as practiced in the prior art. In the illustrated embodiment of the invention, the explosive charge is mounted in a tube 48 which extends into the reservoir 24 and provides a conduit for the wires 32. It should be noted that the construction of the reservoir could be such as to provide preweakened portions in the walls of the reservoir 24 so as to facilitate the shattering of the reservoir by the explosive 30. Moreover, suitable means, such as a screening means could be disposed around the reservoir 24 so as to impede movement of fragments 46 and prevent their impact with the confinement 16. The provision of a screening means would, of course, further facilitate particalization of the fluid 28 as it passed through the holes in the screening means to the interior of the confinement 16.

Upon activation of the explosive charge 30, heat caused by the resulting explosion is imparted to the liquid 28. This heating of the particles 34 of the gas-producing liquid 28 further promotes vaporization of the liquid. Thus, the safety apparatus 10 contemplates not only particalizing the liquid 28 to effect a higher rate of vaporization thereof, but also heating the liquid 28 to further promote vaporization of the liquid.

What is claimed is:

1. Safety apparatus for protecting an occupant of a vehicle during a collision comprising an expandable confinement having an expanded condition and a collapsed condition, and means for expanding said confinement from the collapsed condition to the expanded condition upon the occurrence of a collision to restrain the occupant, said means for expanding said confinement including a burstable liquid reservoir disposed within said confinement and containing a gas-producing liquid therein and means for bursting said reservoir and projecting said liquid in a particalized form into the interior of said confinement including an explosive means located within said reservoir and operable to burst said reservoir upon detonation thereof, said explosive means further being effective to heat said liquid upon particalization thereof to thereby effect rapid vaporization of said particalized form of said liquid, whereby bursting of said reservoir will effect immediate liquid communication between the interior of said reservoir and the interior of said confinement to effect rapid inflation thereof.

2. Safety apparatus as defined in claim 1 wherein said explosive means is positioned in said liquid reservoir at its centroid.

3. Safety apparatus as defined in claim 1 wherein said gas-producing liquid is stored at a relatively low pressure in said liquid reservoir.

4. Safety apparatus as defined in claim 2 wherein said gas-producing liquid is Freon.

5. Safety apparatus for protecting an occupant of a vehicle during an accident comprising an expandable confinement having an expanded condition and a collapsed condition, and means for expanding said confinement from the collapsed condition to the expanded condition upon the occurrence of an accident to restrain the occupant, said means for expanding said confinement including a burstable liquid reservoir containing a gas-producing liquid therein disposed within the interior of said confinement and means for bursting said reservoir to effect immediate liquid communication between the interior of said confinement and said gas-generating liquid in the interior of said reservoir and projecting said liquid in a particalized form through the interior of said confinement to thereby promote vaporization of the liquid and rapid expansion of the confinement from the collapsed condition to the expanded condition.

6. In a safety apparatus for inflating an inflatable confinement having an operative expanded condition and an inoperative collapsed condition, and a liquid reservoir containing a supply of gas-producing liquid therein, the combination with said liquid reservoir of means for effecting a transfer of the liquid from the reservoir in a particalized liquid droplet form to the interior of said confinement to thereby promote a rapid vaporization of the liquid and expansion of said confinement, said last-stated means including explosive means disposed approximate the centroid of the liquid reservoir prior to activation, said explosive means being activatable to particalize the liquid and supply heat thereto to effect the rapid vaporization of said liquid, and wherein the liquid reservoir is burstable upon activation of said explosive means.

* * * * *